(12) United States Patent
Holt et al.

(10) Patent No.: US 7,620,595 B1
(45) Date of Patent: Nov. 17, 2009

(54) SYSTEM, METHOD, AND COMPUTER PROGRAM PRODUCT FOR DISTRIBUTING CASH FLOW OR ASSET INTERESTS OF A FINANCIAL PRODUCT

(75) Inventors: James O. Holt, Vienna, VA (US); Ann Wood Rihn, Leesburg, VA (US); Daniel Lee Williams, Sterling, VA (US); Mi Jee Song, Arlington, VA (US); Walter Caetano D'Andrade, Fairfax, VA (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 522 days.

(21) Appl. No.: 11/154,622

(22) Filed: Jun. 17, 2005

(51) Int. Cl.
*G06Q 40/00* (2006.01)
(52) U.S. Cl. .............................. 705/38; 705/36; 700/99
(58) Field of Classification Search ............. 705/35–45, 705/99; 707/10; 715/762
See application file for complete search history.

(56) References Cited

U.S. PATENT DOCUMENTS 6,910,045 B2 * 6/2005 Hickey et al. ............... 707/102

2005/0278645 A1 * 12/2005 Maur et al. .................. 715/762

OTHER PUBLICATIONS

An Account Object Infrastructure for Knowledge-based Enterprise Models. Guido Geerts and William McCarthy, Michigan State University, Jul./Aug. 1999.*
An Object Oriented Framework for Accounting Systems. Paul Keefer, SUNY College at Buffalo, 1982.*
Modifiable Templates Facilitate Customization of Physician Order Entry. Franklin et al., Clinical Systems Research & Development, Partners Healthcare System, Boston MA, 1998.*

* cited by examiner

*Primary Examiner*—Thomas Dixon
*Assistant Examiner*—Clifford Madamba
(74) *Attorney, Agent, or Firm*—Oblon, Spivak, McClelland, Maier & Neustadt, L.L.P.

(57) ABSTRACT

A system, method, and computer program product is used to associate an account template representing the distributees and/or accounts having an ownership interest, entitlement or right to a portion of a cash flow or asset interest stream. The account template is applied to an electronic record of a payment representing a cash flow stream. The template may be rapidly and quickly exchanged for a new template or updated responsive to changes in the attributes of the cash flow stream or to events in the environment of the cash flow stream.

43 Claims, 5 Drawing Sheets

SYSTEM, METHOD, AND COMPUTER PROGRAM PRODUCT FOR DISTRIBUTING CASH FLOW OR ASSET INTERESTS OF A FINANCIAL PRODUCT

BACKGROUND OF THE INVENTION

1. Field of the Invention

The invention relates to a system, method and computer program product for assigning, apportioning and/or characterizing cash flow or asset interest streams from a financial product such as a loan in the primary or secondary mortgage market, to a plurality of accounting entries or entities each having an interest in at least a portion of the cash flow or asset interest streams, to thereby distribute the cash flow or asset interest among a plurality of accounts by applying a "chart of accounts template" (CoAT) to the cash flow or asset interest stream. The invention includes setting-up a template of accounts and/or distributees by analyzing one or more attributes associated with the cash flow or asset interest stream and/or diagnosing a payment to determine if a business event or payment event has taken place, and assigning a new account template or changing the account template if a trigger for a different account template is detected.

2. Description of the Related Art

The market for financial products is an important element of the modern global economy. Participants from all over the world are able to secure, underwrite, guarantee, loan, etc., money and other fungible goods through financial products that allow the characterization and distribution of the cash flows and/or asset interest streams associated with an asset such as money, goods, property, and/or loans. The cash flow and/or asset interest streams associated with the asset may then be traded in secondary markets.

A cash flow stream may include a continuing flow of payments, which may be periodic such as a stream of scheduled or unscheduled, predictable payments. A cash flow stream may also be one or more payments that may be the same or different and occur with irregular frequency. Examples of cash flow streams include licensing or royalty payments, interest payments on a loan, accounts receivable, annuity, dividends, etc. An asset interest stream is a flow of any interest (monetary or otherwise) that continues for a predetermined or indefinite period and may be derived from an asset or associated with an asset. Examples of asset interest streams include shares in a property, corporation, or a loan other tangible or intangible item of value.

A mortgage is one example of an asset that may have a cash flow stream associated with it. While the present invention is not limited to the processing of loans (as it covers the processing of other securities and asset streams), home mortgage loans will be used as an illustrative example of conventional cash flow processing. The mortgage can be considered an asset by the party (e.g., a financial institution) that has beneficial ownership rights to the loan (i.e., the lender, purchaser of a loan, or entity that has an ownership interest in a mortgage-backed security). In the example of a mortgage, the cash flow stream of the mortgage includes the interest and principal payments and/or fees made by the borrower to the owner of the loan. Mortgages have been described in detail (see for example Guttentag, J., "Mortgage Encyclopedia: An Authoritative Guide to Mortgage Programs, Practices, Prices and Pitfalls," CWL Publishing, Enterprises Inc. Madison Wis., 2004, and FREDDIE MAC FACTBOOK, 2005, pages 1-105, available at www.freddiemac.com, the entire contents of each of which being incorporated herein by reference).

In different respects, primary and secondary mortgage markets function to provide loans to individuals and/or to resell loans to investors, respectively. The secondary market pools and repackages loans for resale. In the secondary market, loans are often characterized by the cash flows associated with the loan. The cash flow stream and/or the loans may be resold to investors in their entirety or only a portion of an interest in a certain loan may be resold (e.g., only a fraction of the total cash flow stream may be sold to another party). Loans may be resold to investors in the secondary mortgage market through products such as REMICs (real estate mortgage investment conduit) or other mortgage backed securities (MBS).

Figure 1:
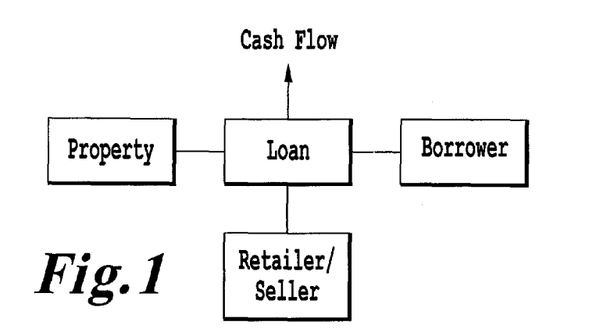
FIG. 1 is a flowchart that shows the components of a loan.

A loan may be represented by at least three components including the borrower, the property, and the note (e.g., the contractual terms that define the borrower's and lender's obligations for exchange of the cash flow stream). A virtual model of a loan is shown as FIG. 1. Each of the borrower, the property and the note may be represented by specific associate data sets, that provide the basic initial information about the loan. The borrower, note, and property data may be characterized as inherent attributes of the loan.

In the past, a single financial institution may have assumed responsibility for all aspects of a loan including, for example, evaluation of the underlying property (i.e., the asset acting as collateral for a loan), collection of the borrower's payment, and determination of the borrower's creditworthiness. Today each of these and other functions of the loan selling, marketing, underwriting, servicing, and pooling processes may be handled by different entities, each of which is an expert in a particular aspect of the loan. In a modern financial market, when an individual borrows money, for example for the purpose of purchasing a home, all of the aspects of any individual loan are rarely managed by a single entity. All the asset interests can be owned and managed by more than one entity. Likewise, in the secondary mortgage market the investor or reseller of the loan out-sources many of the tasks associated with maintaining, servicing and accounting for any particular loan.

Different aspects of a loan (e.g., portions of the borrower's payments representing the loans cash flows) may be alienated or separated from the original loan or original loan agreement (e.g., the agreement made between the borrower and a lending party such as a financial institution and a bank). In many cases individual loans are collected and the cash flow streams (e.g., the borrower's payments) are passed through from the individual loan and pooled for efficiency and ease of handling. The total cash flow (e.g., borrower's payments) or any portion of the incoming or outgoing cash flows and/or debt obligations of the pool may be sold to other financial institutions or any third party. The cash flow streams or asset interests remain associated with the underlying loan or financial product and may be traced to the original borrower or lender while still being divided and owned or managed in multiple representations.

The financial accounting that records and tracks cash flow payments from borrower to lender, lender to financial institution, servicer to investor may be represented by a series of interconnected cash flow streams. In order for any party participating in, for example, the loan management process to properly track and record the cash flows of a loan or loan pool, certain accounting practices and automated systems conventionally have been used. Conventional systems (hereinafter legacy systems) typically contain hard-coded calculations, logic gates and instructions for dividing and assigning portions of cash flows streams and/or payment streams to the parties that have an interest in the loan or that are otherwise associated with any particular loan transaction. For example, in a legacy system when a borrower makes a loan (i.e., when a borrower undertakes a commitment to make a periodic stream of payments according to the terms of a contract), certain variables are preset in the loan's contractual requirements. Such conditions may include the interest rate, payment periods, penalties, etc.

A servicer or financial institution managing the loan may record the borrower's payments (e.g., the incoming cash flow stream) and credit certain related parties (e.g., represented by account entries) with payment for their services and/or fees associated with the loan. For example, an investor's fees may include payment for items such as a guarantee fee, while a servicer's fees include compensation for managing and accounting for loan activity.

In order to organize the incoming cash flow stream and accurately make payments to the different parties involved in the collection and maintenance of a loan, the servicer, using a legacy system, may have automated the process of recording the incoming cash flow and outgoing payments in a manner such that the incoming cash flow stream was immediately apportioned to all parties requiring payment for maintaining or servicing the loan. The cash flows and payments in legacy systems were distributed by way of, for example, a distribution formula that calculated the share of the cash flow stream owned or transferred to any party. Such legacy systems include MIDAS, SAP as well as servicing systems such as Fidelity's MS Papp.

The processes of legacy systems are typically hard-coded and offer little or no flexibility with respect to changing the distribution formula. As recognized by the present inventors, legacy systems, because of their inability to rapidly change the account structure of the cash flow or asset interests of a financial product (e.g., the distribution formula), hinder the ability to tailor financial products derived from or associated with unconventional cash flow or asset interest streams. This drawback of legacy accounting systems represents a significant problem for loan products or mortgages in the primary and secondary market. The inability of legacy systems to quickly add or change the distributees of a payment stream has hampered the development of new financial products and has made it difficult, time consuming, and expensive to change distributees even when there is a clear financial incentive to do so (for example when a loan can be managed in a more economical manner by adding a new distributee for a specialty service). Legacy systems have restrained the market to only a limited number of products that must be "shoehorned" into the demands of a customer base of very diverse borrowers that may have widely varying income and payment periodicity characteristics. Offering flexibility in cash flow or asset interest management enables a variety of sophisticated financial borrowing products previously less widely offered.

Legacy systems may inhibit competition between lenders because the cost of changing any particular distributee is so burdensome and time-consuming that it becomes economically impractical. Thus competition between loan servicers is not maximized and the demand for new loan servicing products and/or services may be left unfilled. Moreover, savings that could otherwise be realized by more efficient financial systems are not available to encourage the marketing of new loans tailored to certain borrowers who may otherwise not be able to qualify for a loan.

Legacy systems make it difficult to accommodate changes to existing loans during the life of the loans. For example, in the past, an individual may have borrowed from a financial institution with original loan conditions that included monthly payments. If the borrower wished to change to bi-weekly payments it may not have been possible to accommodate the change to the individual's loan without substantial difficulty and new coding, a cost that would eventually be passed to the borrower making the new loan less attractive economically.

Thus, the present inventors recognized that the inability to quickly react to change and accommodate new and/or changed conditions such as the distributee structure is a substantial drawback of legacy systems or alterations in payment frequency that prompt the adjustment of accounting rules.

Martin Fowler discusses complex accounting systems and the use of posting rules to assign certain properties, characteristics, and/or features to an element of an accounting entry in "Analysis Patterns: Reusable Object Models," Addison Wesley Longman, Inc., Reading Mass., 1997 (incorporated herein by reference in its entirety). By assigning a posting rule to a cash flow stream, components of the cash flow stream may be divided (e.g., distributed) to different accounts. The posting rules of the Fowler model may be permanently assigned or hard-coded so that the same rule always applies to a particular cash flow stream. Even though the same rule may be used in the Fowler model, because the Fowler posting rule may have different sub-elements, it is possible that any particular cash flow stream may be treated differently depending on the sub-elements of the posting rule set.

The Fowler model may not be sufficient for handling the demands of many modern accounting systems such as those for modern financial products where any particular posting rule may need to be changed and/or substituted with a different posting rule on a real-time basis. Further, the Fowler system does not provide a way of globally organizing posting rules so that they may exist in a single database and may be subject to bulk or global editing.

The Fowler model also does not provide a process wherein the selection or change of a posting rule is automated. While Fowler may describe the construction and organization of a base accounting system that assigns posting rules to incoming cash flows, it may not be possible to implement the Fowler system on a practical level because it does not provide an option for automating posting rules or for including posting rules in an organized sub-family for application to a cash flow stream interchangeably with other rules in conjunction with a logic system that may rely on one or more business events for choosing a particular accounting scenario or posting rule.

Further, the Fowler model does not self-assign distribution values, account templates or accounting rules to an incoming cash flow stream. Instead, the distribution values and/or accounting rules are preassigned and/or hard-coded by an operator.

As recognized by the present inventors, a method in which the cash flow distributions to different distributees (e.g., accounting entries/entities) can be readily and quickly changed would offer an advantage to all participants of a loan including the ability of the loan's beneficial owner to find parties to carry out activities such as servicing to obtain the lowest cost services for any particular sub-cash flow stream. One way to achieve flexibility in assigning new distributes to loans in the primary and secondary markets is by changing the basic properties and structure of the loan. This would however substantially complicate the primary and secondary mortgage markets' systems and usual business processes.

While working to solve the problems of legacy systems, the present inventors have determined that one way to provide flexibility with regard to assigning portions of the cash flow streams of a mortgage to the distributees of the mortgage is to associate a cash flow template with the cash flow stream associated with the loan (associate a cash flow template with the borrower's payments). Such a template would provide a readily configurable and flexible set of rules for directing cash flow streams to particular parties and/or accounting entries. The template may include, for example, definitions for the cash flow distributions as defined by various contracts to the servicer, a guarantee fee, and any number of additional sub-cash flow streams which may go to the same or related parties. Because the cash flow streams of the loan are not changed in the primary mortgage market any changes to cash flow streams must be carried out in the template. Therefore the template provides a readily configurable way for redistributing cash flows, securitization obligations, service fees, principal payments and interest payments to any number of different parties.

SUMMARY OF THE INVENTION

One aspect of the present invention is to address the above-identified and other limitations of conventional systems and methods for processing cash flow streams.

Accordingly, the inventors have described a system, method, and computer program product for real time changes of the cash flow streams associated with a loan or a loan pool (or other asset interest) that may include declaratively assigning a template of distribution parties and/or accounting entries to associate, assign, or distribute portions of the cash flow or the asset interest stream and/or obligation to different accounts representing different distributees or parties to the loan or views of the loan. Declaratively assigning a template to a cash flow or asset interest stream permits the loan or asset owner to reapportion or redistribute any portion of the cash flow to any number of independent or related parties represented by accounting entries in a time span that is shorter that the time span for the normal payment stream of the loan or asset interest.

One method and system according to the present invention, receives a data representation of a record of a financial product, where the data representation has an attribute pattern. A processor compares the attribute pattern with a plurality of usage criteria stored in memory, each of the usage criteria having a predetermined set of values and each is associated with a chart of accounts template that is part of a set of chart of accounts templates. This comparison is performed to identify a particular chart of accounts template for the attribute pattern. Subsequently, the particular chart of accounts template is assigned to the data representation.

DETAILED DESCRIPTION OF THE INVENTION

The invention system, method, and computer program product may be applied to the cash flows associated with a financial product such as a loan, or to any interest deriving from an asset. A mortgage is one type of loan. Other loans such as personal loan, car loan, other securities, or any variety of debt instrument securities, are sources of asset cash flow streams that may be treated with the inventive system, method, and/or computer program product. Other financial products to which the invention may be applied include securities, insurance revenue, annuities, and other sources of payment streams.

In exchange for obtaining a loan, a borrower promises to make one or more payments (e.g., a stream of predictable payments) to the lender (or an assignee of the lender such as the owner of a mortgage). The payments are for the purpose of repaying outstanding principal and any interest payments associated with borrowing. Other payments may be included with the borrower's principal and interest payments and may include, for example, insurance, tax escrows, etc. Typically, the borrower makes a payment to a single financial institution to cover the borrower's obligation for a specific period or specific payment obligation.

Once the borrower's payment is received by a payee (e.g., the manager of a mortgage such as a bank, or financial institution, and a loan servicer), the borrower's payment is broken into multiple sub-payments (e.g., sub-cash flow streams) so that portions of the incoming cash flow are distributed to all parties who have a financial stake in the loan, or who are otherwise entitled to some portion of the incoming cash flow stream or a derivative thereof.

The cash flow associated with any loan or loan pool may be represented by an attribute pattern including information relevant to the note, the property, the borrower, the contract and other information. The attribute pattern may include both inherent attributes of a loan and secondary attributes associated with the environment in which the loan was made (such as details regarding the selling process, the origination of the loan, etc.).

The inherent attributes of a loan may include, for example, the credit-worthiness of the borrower, the location and appraised value of the property used as collateral, borrower income and content information, terms of the original note, etc. In addition to the inherent attributes of the loan, the loan may have associated with it other information regarding, for example, the selling process, the servicing data, disposition process and business rules. These characteristics may be characterized as secondary attributes of the loan.

In addition to the information regarding the borrower, property and note, a loan may have associated with it information regarding other aspects of the loan, for example information regarding the asset exchange process and servicing processes, marketing information, and terms of business. The information packets may contain descriptive information about the loan or loan making process that may be used when analyzing the loan or when undertaking a decision-making process with regards to the treatment of the loan or any cash flows derived from it. Thus, the loan may be virtually represented by information that may be inherent to the loan such as the borrower note, property data, etc. and by information that is dynamic and may change with time or with changes in the loan environment.

The attribute pattern associated with a loan can include attributes supplied at delivery under the Mortgage Industry Standards Maintenance Organization, Inc.'s (MISMO) dataset Ver. 2.1, 2.2 or 2.3, for example, (each of which is available at www.MISMO.org and is incorporated herein by reference, "the MISMO dataset"). The MISMO dataset is used in the secondary mortgage market to organize information (e.g., attribute pattern) describing a loan. Other information, such as the information collected on Mortgage submission schedules, such as Freddie Mac's Form 11 (available at http://www.freddiemac.com/sell/forms/pdf/11.pdf) and Form 13SF mortgage submission voucher (available at http://www.freddiemac.com/sell/forms/pdf/13sf.pdf each incorporated herein by reference in its entirety) may alternately define and describe attributes of a loan or a cash flow stream associated with the loan.

In the case of a loan, the loan may be represented by a cash flow defined by one or more payments over a period of time (for example, monthly payments of $1,000 (P&I) due on the first day of each month for 360 months). In this form, the borrower's obligation to the lender is paid off slowly in equal monthly installments until the loan is completely amortized (e.g., extinguished).

The asset (e.g., the property) used to collateralize a loan or a cash flow stream may also affect the cash flow. In most cases the asset used to collateralize a loan must have at least the same value as the loan amount. An asset having a relatively higher value may permit a borrower to obtain a loan for a proportionally greater sum of money. Consequently the loan will have associated with it a greater cash flow stream (e.g., the periodic payments needed to amortize a higher loan amount will be larger), requiring some changes to the posting rules.

The terms of the note are directly related to the loan's cash flow stream. The terms of the note may include the basis from which the principal and interest payments are calculated payment frequency, maturity period, and loan adjustment parameters (if applicable). The note may also define the penalties associated with breach or early repayment.

A mortgage may be subject to activity (e.g., changes in ownership or terms) in a primary mortgage market, a secondary mortgage market, and further markets.

Figure 2:
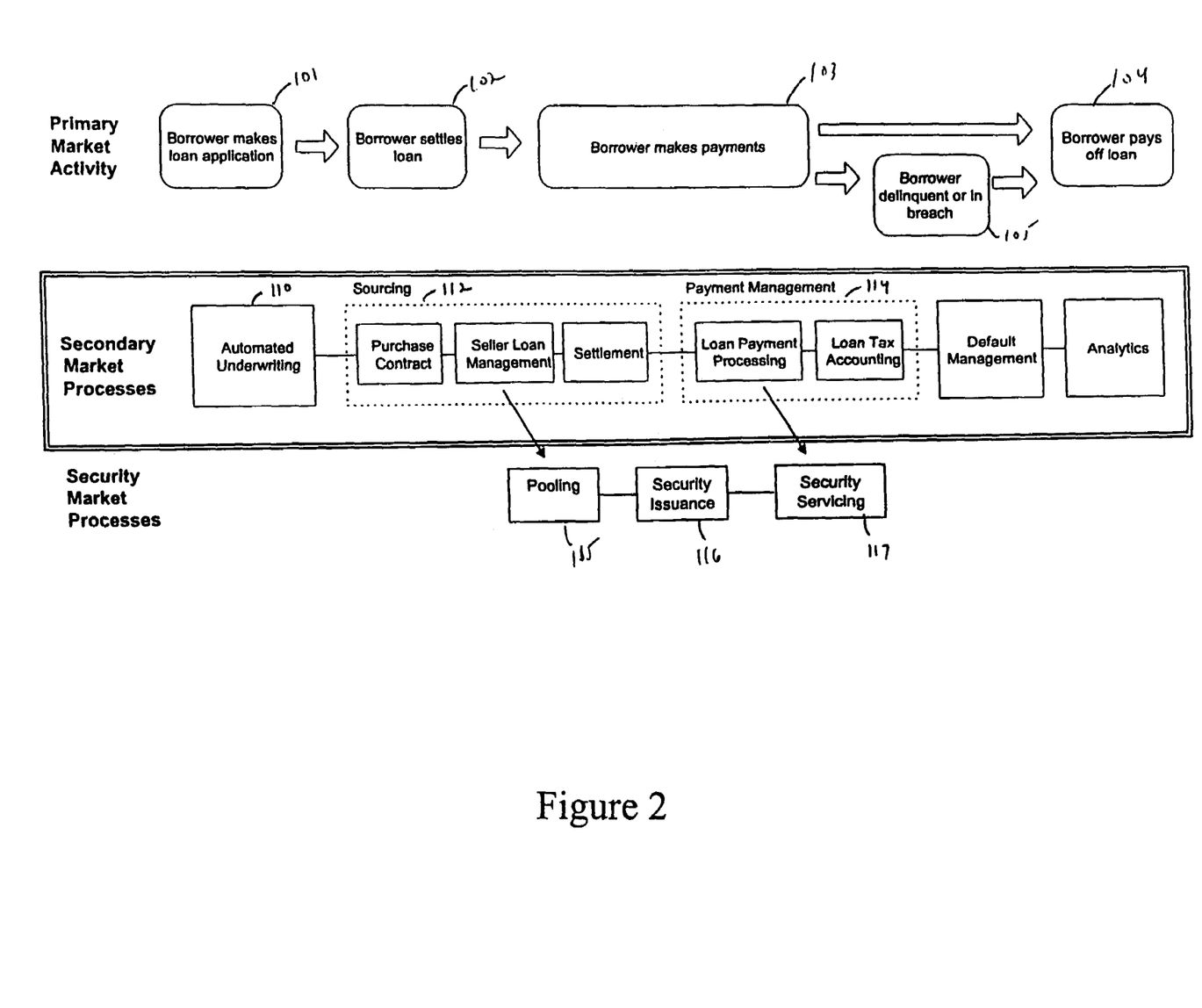
FIG. 2 is a flowchart that shows cash flow streams associated with a loan and their redistribution to a plurality of accounts.

FIG. 2 shows primary and secondary mortgage market processes. In the primary mortgage market the loan is originated after a borrower has made an application 101 and contractually settled the terms of a loan 102. The borrower receives funds to finance a home in the amount of the mortgage in return for the borrower's promise to make a series of periodic payments 103 to repay the amount borrowed. In addition to repaying the amount borrowed (i.e., the principal payments), the borrower makes interest payments as compensation to the party providing the money for the loan.

The loan may be extinguished upon the borrower's delivery of all promised payments thus terminating the borrower's obligation to the lender 104. The mortgage may alternatively be extinguished if the borrower defaults or is in material breach of the terms of the loan contract 105. Default or breach may lead to foreclosure whereby the party who made the loan becomes the adjudicated—owner of the borrower's collateral (e.g., a home or other real estate) as a substitute for the borrower's periodic payments.

The primary mortgage market includes the marketing and selling of a loan to a borrower. The characteristics of the loan, such as the credit-worthiness of the borrower, the value of the collateral, the terms of the note etc., play a significant role in determining the value and conditions of the loan in the primary mortgage market. In the primary mortgage market, loans may be graded or given a score based on the characteristics of the underlying loan.

From the perspective of the primary mortgage market the loan does not change significantly over time. This, of course, takes into account that payment periods, interest rates, securitization, etc, may change over the life of the loan; however, the basic and/or inherent information associated with the loan (e.g., the borrower, expected cash flow streams, collateral) does not typically change during the life of a loan.

Activity in the secondary mortgage market occurs when the party responsible for originating the loan to the borrower (e.g., the bank which marketed the loan to the original borrower) resells the loan to another individual, investor, institution, or entity. When the loan is resold and enters the secondary mortgage market it may be packaged or pooled together with other mortgages and/or loans, typically with loans having similar characteristics with respect to interest rate, maturity, risk etc. Pooled loans provide combined cash flow streams than may be handled in a more efficient manner than reselling, maintenance, servicing, and marketing individual loans. The secondary mortgage market may resell repackaged financial products based on the combined or pooled cash flow streams of a loan pool to investors, or other parties. The secondary mortgage market must handle and characterize large numbers of mortgages in order to obtain the benefit of substantial economies and efficiencies of scale.

The secondary mortgage market process includes the resale of the borrower's loan from the party that originated the loan to another party such as an investor. Because a large number of loans are handled in the secondary mortgage market, and may be pooled to simplify the investment and securitization process, the loans may be maintained and monitored by a computer-based automated management process to carry out automated underwriting 110, sourcing 112, and payment management 114. Loan sourcing 112 includes the process by which an individual loan is purchased from an originator or another party holding title to a loan (e.g., the person or entity who holds beneficial ownership rights). It also includes seller loan management and settlement. Sourcing may be automated through an automated purchase contract.

Sourcing 112 and payment management 114 may involve intermediate security market processing steps where loans are pooled 115 and converted into an issued security 116 where it is then serviced 117.

Servicing functions such as payment management may also be automated. Payment management may become very complex when the loan payments associated with the loans in a particular loan pool vary in amount, principal/interest ratio, and/or periodicity of payment from what is expected. Variability exists not only in the payment stream coming from the borrower but also in the distribution of the incoming payment stream to the parties who have an interest, reciprocal obligation or stake in the cash flow stream.

In one embodiment, the inventive system, method, and computer program product each functions at least in the payment management activity of the secondary mortgage market.

Changes in the attribute pattern of a loan may affect the way the loan is treated in the secondary mortgage market. The changes in the loan (e.g., changes in the attribute pattern) may be voluntary or involuntary on the part of the borrower or the beneficial owner of the loan. Alternatively, changes in the loan may be caused by the exercise of contractual provisions which benefit the retailer, the reseller, or the borrower. An involuntary change may include, for example, destruction of the collateral or devaluation of the collateral. A voluntary change may include, for example, the inclusion of greater payment amounts to reduce the principal amount, delayed payment of periodic amounts, etc. If such changes occur to a loan, it is possible that the cash flow stream associated with the loan will change and consequently the pattern of cash flows to different distributees associated with the loan may change.

The loan and the cash flow stream(s) associated with it may be affected by changes in any of the inherent attributes which define the loan. For example, a borrower may affect the cash flow stream of a loan by changing the repayment period or periodicity of payments (e.g. providing bi-weekly instead of monthly payments or by changing the loan term to 360 months from 240 months). The borrower may further affect the loan through the borrower's intrinsic characteristics. For example, a borrower who becomes a lesser credit risk after the loan is initially approved may be allowed to pay a lower interest rate than originally set if such a creditworthiness-based change in interest rate is allowed by the contractual terms of the loan. Therefore, in some cases, the financial characteristics of the borrower may affect the cash flow streams associated with the loan.

In addition to inherent and secondary attributes there are other factors which may be taken into account when characterizing or calculating the value of a loan. These factors may include any externality that affects the loan's cash flow streams. This may include information pertaining to general macroeconomic conditions, specific business events and information regarding the loan originator (e.g., the retail seller of the loan such as a bank). Such information may typically be reflected as business events in the loan's cash flow stream.

For example, a retail seller of a loan may wish to tailor a loan so that payments are more financially accessible to certain borrowers. Thus, a retail seller may market a certain loan in a way that may change the cash flows streams associated with the loan. One way the retailer seller can affect the cash flow streams of the loan is by offering certain incentives and payment models. For example, the retail seller may offer a loan where teachers, who only have an income 9 months of the year, only make payments during their months of employment.

When a loan is resold in the secondary mortgage market the cash flow stream associated with it may need to be redirected to one or more new or different distributees (e.g., parties or accounts). A distributes is any party or account that receives or needs to account for a portion of the cash flow stream of a loan. A distributee may be defined by the terms of the loans (e.g., defined in the note) or may be defined by contractual provisions of the loan (e.g., defined by the product description of the loan). A distributee may also have a right to a portion of a cash flow stream by virtue of an agreement with any party having a right or ownership interest in the cash flow stream.

Distributees may also include those parties or account associated with the functions of servicing, maintaining, and/or selling the loan. As already mentioned above, in order to achieve efficiencies and economies of scale, the secondary mortgage market may divide the responsibilities of maintaining a loan among a plurality of specialists each of whom may offer the most efficient value/quality package for a particular function or service of the loan. Thus in the secondary mortgage market, cash flows may be stripped (e.g., alienated) from one or more party's loan responsibilities such as servicing the loan and/or guaranteeing the loan. However, since servicing and guaranteeing are still necessary functions of the loan, any party carrying out one or more of these functions of loan management must be compensated by sharing a portion of the cash flow proceeds (e.g., the servicer of the loan is given compensation for collecting the borrower's payments typically by giving the servicer a portion of the borrower's payments). For example, servicing may be carried out by one or more other parties in exchange for a portion of the cash flow associated with the loan. A party servicing a loan (for example a party which collects the periodic payments associated with the loan and/or provides telephone representation to answer questions regarding the loan) may receive a predetermined percentage of the periodic payment stream as compensation for carrying out the servicing functions. Likewise, a party guaranteeing a loan may be compensated with a portion of the cash flow stream associated with the loan as compensation for acting as guarantor for the loan. Parties with ownership interest in the repayment of the loan's outstanding balance (e.g. the investor) would receive a portion of the periodic payment, typically P&I. In order to facilitate the payment (e.g., distribution of the cash flow stream) to all parties entitled to a portion of the loan's cash flow proceeds, the cash flow stream may be proportionally divided into different accounts. Each account may identify, for example, a party having some interest in the loan. For example, a loan which yields a $1,000 monthly cash flow stream may have accounts for the servicer, the guarantor, the principal payments and interest payments from the borrower and/or investor(s).

In one aspect of the invention each party having an interest in proceeds of a cash flow stream are defined in an account template (i.e., a chart of accounts template; hereinafter CoAT). A CoAT may include information pertaining to the holder of the accounts (e.g., the party having an ownership interest in a portion of the ash flow stream) and calculations regarding the amounts to be distributed to each account. The CoAT may further include logic routines that function to determine whether certain conditions such as business events, or payment events, result in changes in any inherent or secondary attributes have occurred. The CoAT provides a mechanism for changing and/or redefining cash flow distributions for large numbers of loans individually or in a loan pool.

In one embodiment, a CoAT functions to divide a cash flow stream to those parties and/or accounts having an interest or a claim to a certain amount of the cash flow stream. For each party having an interest in a cash flow stream there may be one or more accounts. For example, for the party collecting the principal and interest payments of a loan, certain portions of the cash flow stream may be apportioned (e.g., distributed or credited to certain accounts) and posted to separate principal account and interest accounts each of which may be owned by the same party. A portion of the cash flow posted to the interest account may later be further posted to another sub-account. If another party is carrying out the servicing functions for the financial institution collecting the principal and interest payments, the fee for the servicing carried out by the servicing company may be posted separately into an account for the servicer. Likewise, another account may be posted with a certain portion of the cash flow stream for a guarantor that is guaranteeing the loan.

Figure 3:
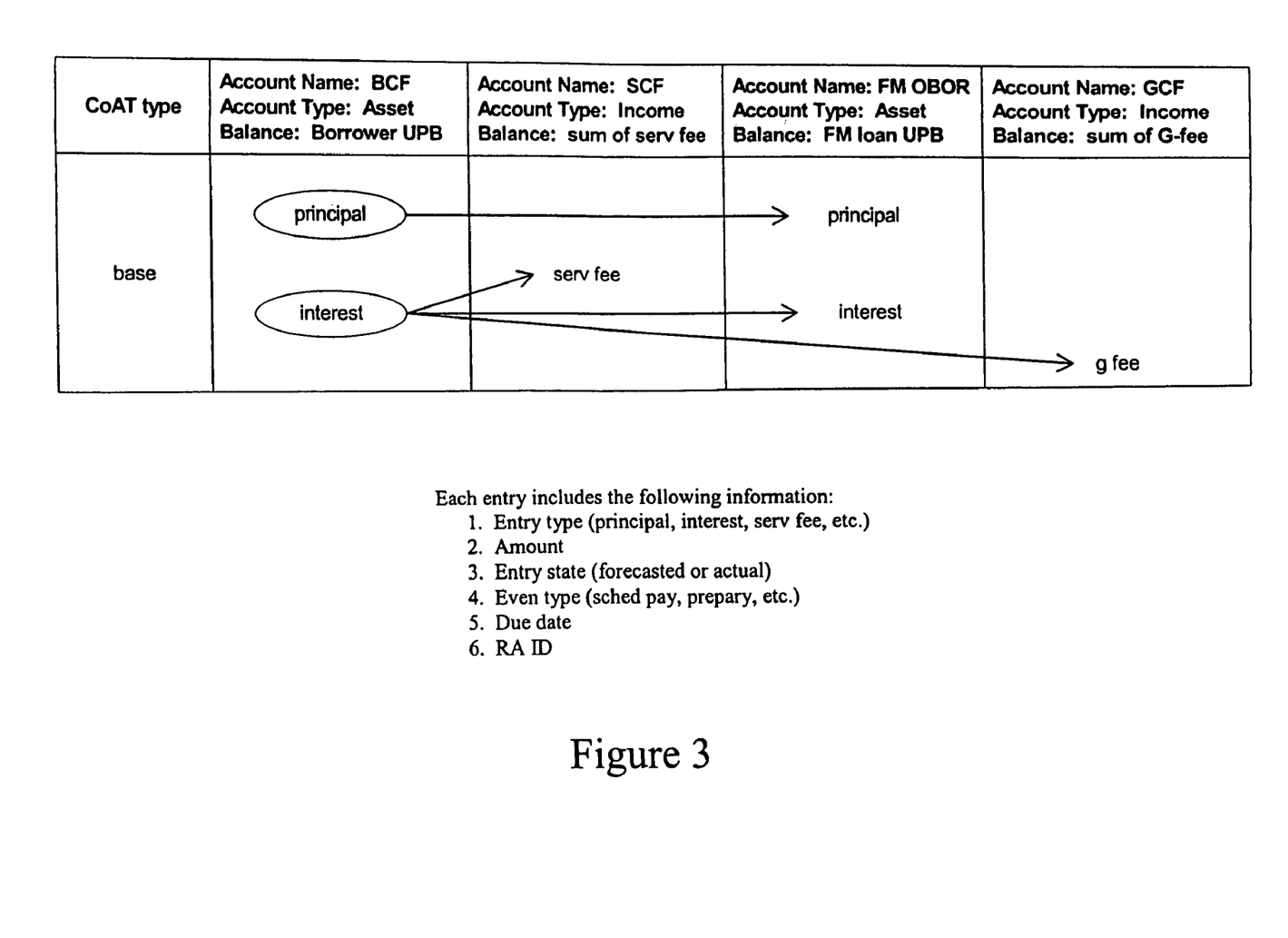
FIG. 3 is a data structure of a template imposed on a loan to define the cash flow distributions of the loan.

The use of a CoAT to distribute a cash flow stream is shown in data structure of FIG. 3. The CoAT is defined by type, e.g., "base" CoAT, which is a generic CoAT, or Asset specific CoAT. For the particular CoAT, a payment is first divided into a principal and interest payment. The principal portion is then posted as principal to the FM OBOR account (e.g., for the benefit of "FM OBOR" in FIG. 3). Portions of the interest are then posted to accounts for a servicer fee (i.e., serv fee), main interest component (to FM OBOR) and a guarantor account (i.e., a "g fee" account). FIG. 3 shows how a CoAT may distribute an incoming payment into different accounts. The circled amounts for principal and interest represent the incoming cash flow stream that is made up of a principal and interest payment. The principal and interest payment, which together represent the borrower's total payment, are divided or apportioned between different accounts (e.g., distributees)

such as a servicer account, a guarantor account, and the principal and interest accounts associated with the underlying contract or asset.

In one embodiment, a CoAT is associated with a loan upon origination of the loan. At origination, the loan purchaser may coordinate with the financial institution making the loan (e.g., a bank) to define the terms of the loan so the loan purchaser may set up a CoAT that defines the distribution of payments received from the borrower into accounts such as principal, interest, servicing and guarantor. For a loan having a $1,000 monthly cash flow stream (e.g., the borrower makes a $1,000 monthly payment), the majority of the payment may go to the principal and interest accounts. The amounts separately posted into the principal and interest accounts may change over time. The formula for determining the amount of cash flow to be distributed to the principal and interest accounts may be a part of the attribute pattern of the loan or may be information included in the CoAT. As a conventional loan matures, a greater sum of the borrower's payments is directed to the principal while a declining amount is posted as interest. Since the servicer fee and guarantee fee are traditionally by-products of interest payments, these entries are figured and posted to their respective accounts each time a payment event is detected. If the loan is not resold or renegotiated during its life, the CoAT that is initially associated with the loan may never change. Alternatively, even if the loan is resold many times the CoAT may remain the same throughout the active life of the loan, depending on the resulting subsequent contract terms.

According to the present invention, the application of a CoAT to a cash flow stream may redefine or further define cash flow distributions of cash flows to reflect changes associated with business events and payment events (e.g., either internal or external events).

In addition to the attributes which define or characterize a loan, any number of external characteristics, including, for example, agreements between the borrower and the loan owner and product descriptions that go beyond the information provided by the note may also be used to identify the loan. These additional characteristics may be taken into account by a CoAT and may be used to assess the need to change to a new or different CoAT. For example, a CoAT may be associated with a product description which provides a cash flow definition that includes a formula for determining the principal/interest ratio or logic for detecting business events. The product description may determine whether the cash flow occurs on a regular periodic basis or if there are interruptions and/or skipped payments throughout repayment of a loan. The CoAT can also be associated with any agreement between the loan owner and, for example, the retail seller and/or servicer of the loan.

The use of a CoAT in managing cash flow distribution of a cash flow stream is now described. Receipt of a borrower's payment may be the first event that initiates the entries to a CoAT in order to account for the cash flow stream. A borrower's payment may be received in any one of a number of ways. An incoming cash flow stream (e.g., a collection of borrower's payments in electronic form) may be sent, received, and acknowledged electronically through, for example, an electronic funds transfer (i.e., EFT) or electronic data interface infrastructure. The CoAT may be electronically overlaid on the data which represent the incoming cash flow stream (i.e., the data representation). Each of the receipt of the cash flow stream and use of the CoAT to account for the cash flow stream (e.g., payment) may be represented by an electronic transaction that may occur between different parties or obligees of a loan. For example, the borrower may make a payment to the servicer who in turn reports said payment via electronic data interface of the borrower's payment to the beneficial owner of the loan. Payment activity data (e.g., money transfer) is used to automatically distribute or apportion the incoming cash flow to any number of accounts in the portions defined by agreement between the parties by using the CoAT, which may define one or more of (i) the account identities (e.g., the parties having right of ownership to certain portions of the cash flow stream), (ii) the amount to be distributed to a particular account, and (iii) calculation and/or logic routines to check the cash flows for discrepancies or signals which may trigger one or more other functions of the invention discussed below.

Figure 4:
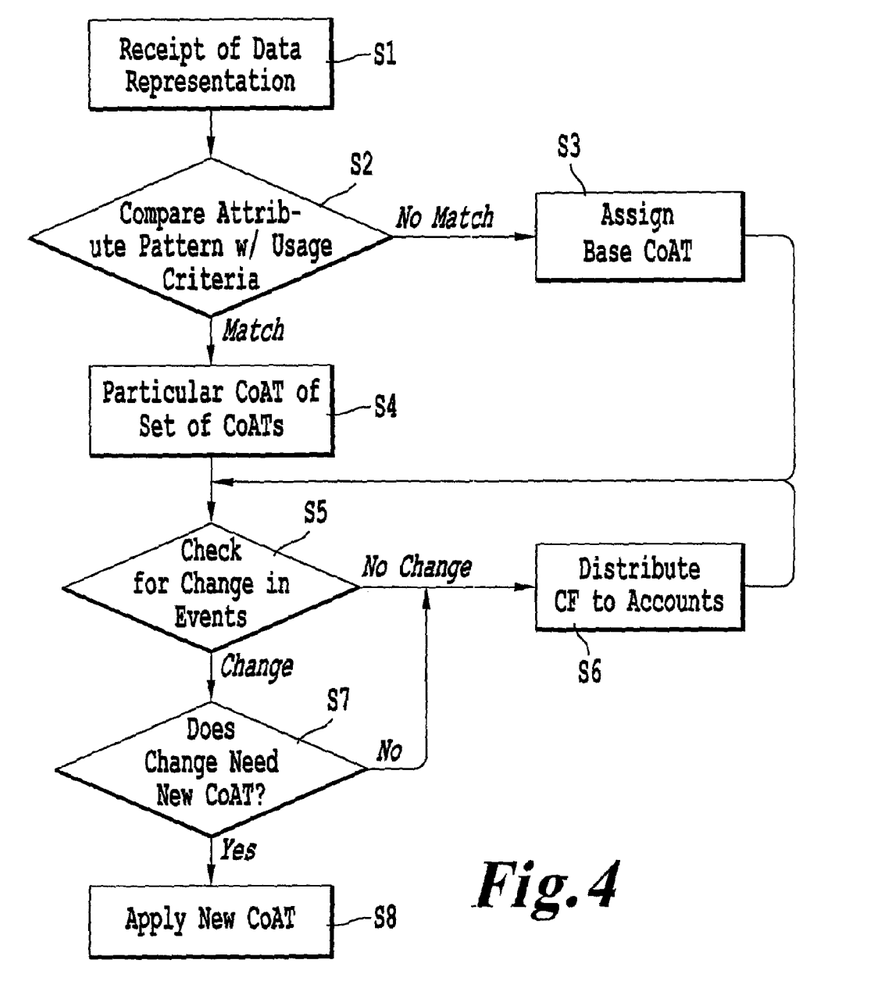
FIG. 4 is a flowchart showing an embodiment of a process for associating a CoAT with a financial product.

FIG. 4 is a flow diagram of one embodiment of the present invention for applying a CoAT to an expected revenue stream. The process begins in S1, where a processor-based system receives a data representation of the revenue stream from a predetermined revenue source (e.g., a loan payment). The process then proceeds to S2, where a query is made regarding whether there is a match between an attribute pattern for the revenue stream with a usage criteria stored in memory. The usage criteria includes a set of values associated with a particular CoAT. If in step S2, there is no match, the process proceeds to S3, where a base CoAT is assigned to the data representation. The application of the CoAT is accomplished by associating the incoming cash flow stream with routing criteria so as to distribute portions of the revenue stream to one or more accounts. After step S3, the process proceeds to S5, as will be discussed. The base CoAT in this situation is a generic CoAT with a predetermined set of payment criteria that is applicable to multiple financial products. Specific examples of attribute patterns and usage criteria are provided after discussion of the process flow.

If the response to the inquiry in step S2 is that there is a match, the process proceeds to step S4, where a particular CoAT is identified and assigned to the data representation. Subsequently, the process proceeds to step S5, where another inquiry is made regarding whether there has been a change in events for the incoming cash flow stream. If the response is negative, the process proceeds to S6, where, upon receipt of payment activity data the cash flow is distributed to the accounts identified by the CoAT and in the proportions identified by the CoAT, and then the process returns to step S5. However, if the response to the inquiry in step S5 is that there is a change, the process proceeds to step S7, where an inquiry is made regarding whether the change requires the application of a new CoAT. If so, the process proceeds to step S8 where a new CoAT is applied, but if not the process proceeds directly to step S6, previously described.

Initially, a servicer or a party having beneficial ownership rights to the financial product may receive, over an electronic medium, a data representation from, for example, a loan servicer or from the borrower, that represents a payment associated with the financial product. Alternatively, an initial data representation may provide confirmation to the beneficial owner of the financial product that a certain loan or other asset is being transferred or added to the assets of the beneficial owner and that a payment may be forthcoming in the future.

The data representation includes an attribute pattern that may be a data collection such as some of the data present in industry-standard forms such as MISMO criteria or FREDDIE MAC Forms 11 or 13SF. It is this attribute pattern that is compared against the usage criteria in step S2 above to determine if a match exists between the attribute pattern and the usage criteria. The usage criteria are a set of predetermined values that are compared against the data representation. The predetermined values may include certain permitted ranges. This process of comparing the attribute pattern of the data representation against usage criteria associated a CoAT permits the present process to assign the correct CoAT to a data representation so that the cash flow stream associated with, for example, a borrower's payment of a loan obligation, is correctly credited in the appropriate amounts to each account having an interest in the cash flow stream. If no particular usage criteria is matched with the attribute pattern, a base CoAT (step S3) may be assigned to the data representation.

Each usage criteria set is associated with a particular CoAT. More than one CoAT may be associated with some of the same usage criteria and/or more than one usage criteria may be associated with the same CoAT. The CoATs associated with the plurality of usage criteria form a set of CoATs that is stored in memory.

The set of CoATs may contain any number of CoATs. For loan accounting purposes, the CoATs are assembled from a set of distributee accounts. The CoAT may be assembled for each instance that an incoming payment is registered or received (e.g., each time a data representation is received the metatag calls for and applies the CoAT calculations to the payment). Thus the CoAT may exist only during the actual distribution of the cash flow and during the time that knowledge of the distributee accounts is needed. An advantage of storing CoATs as a set in memory as a CoAT database and identifying particular CoATs with metatags is that all CoATs of a particular metatag may be globally updated or edited if a change in the CoAT is needed. Another advantage is that new loan (or other financial product) may quickly be accommodated for processing once the terms of the loan are approved by the lender and buyer. Alternatively, because each CoAT is made up of a collection of distributees (e.g., account entries representing the parties entitled to an interest in the incoming cash flow), the distributees can be rapidly and quickly updated or edited as needed based on business events.

In one embodiment, the set of CoATs includes one or more special CoATs and a base CoAT. The base CoAT may be a generic CoAT that is applied to a data representation when the data representation fails to meet special CoAT usage criteria. Therefore, a base CoAT may be a generic CoAT that is assigned to a data representation when no other usage criteria or special CoAT matches the attribute pattern.

The attribute pattern of the data representation may also be compared to a set of loan types stored in memory. Each loan type may be associated with a certain CoAT. A CoAT may be assigned immediately to the data representation when the attribute pattern includes the loan type and the loan type is matched with a particular CoAT. If the attribute pattern of the data representation is not matched with a loan type the process may be stopped and a process of setting-up a CoAT associated with a new loan type may be begun (see discussion below).

Once the attribute pattern of the data representation has been compared with the usage criteria and a CoAT has been assigned to the data representation, the data representation and/or the attribute pattern thereof may be further analyzed to determine if a business event or payment event has taken place. The occurrence of a business or payment event may necessitate the assignment of a new CoAT. Alternatively the detection of a business or payment event may occur before the CoAT is applied after checking for a loan type or after comparing the attribute pattern against the usage criteria.

The changes in environment that may indicate that a change in the CoAT is necessary include business events. Business events may include any event which requires the addition or deletion of an account from the account template (e.g., the CoAT) or a significant change to the calculations associated to entries in the CoAT.

Payment events may occur during the life of the loan. Some payments event may be, for example, a change initiated by the borrower to increase or decrease the payment amount if allowed by the terms of the note. For example, the borrower may elect to skip a payment (if such is allowed by the loan contract). Depending on the conditions of the loan contract, a skipped payment may require the addition of a new account so that fees said to enable the skipped payment can be properly calculated and allocated to the appropriate distributees. Other payment events may include overpayment of the contractual periodic payment by the borrower to decrease the principal amount (e.g., a curtailment). A separate account may be established to segregate any excess principal from the indebted principal.

If a business or payment event necessitating a CoAT change is detected, a new CoAT may be assigned. If no business or payment event is detected and a CoAT was previously assigned to the data representation originally assigned CoAT may be maintained and any cash flow associated with the data representation may be posted to the accounts of the originally assigned CoAT. Business events may include change in contract terms, distributees, or events associated with resolving a default. Comparing the attribute pattern of the data representation with the usage criteria to associate a particular CoAT to the data representation may be carried out concurrently, before or after the comparing step, with a process that sets up a CoAT for a new or existing financial product.

Figure 5:
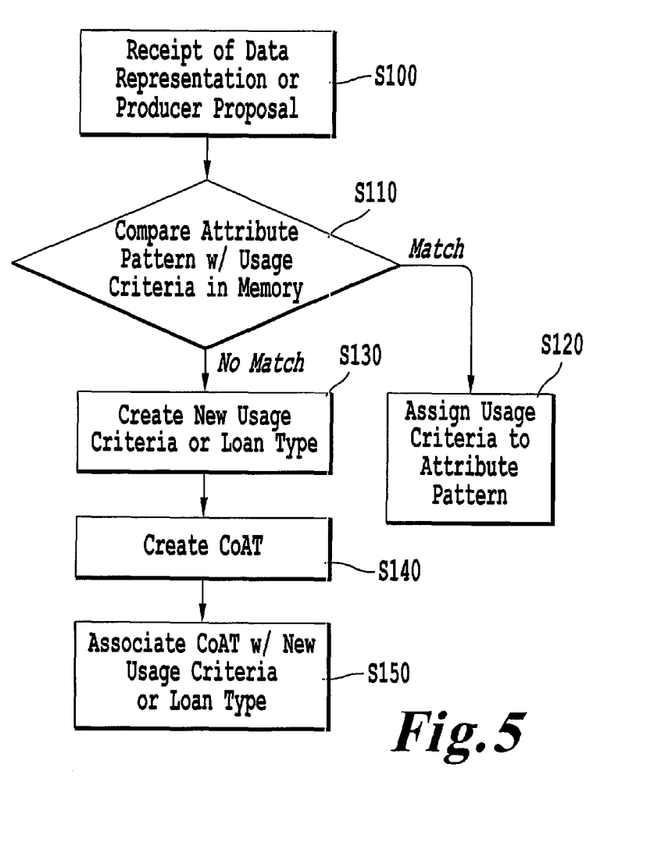
FIG. 5 is a flowchart depicting steps in setting-up a CoAT.

FIG. 5 shows one embodiment of a process for setting-up a CoAT for an existing or new financial product for which a CoAT may not yet be present in a set of CoATs. A data representation of a financial product or a proposed financial product (e.g., a model of a financial product) is received at, for example, a financial institution. The product (such as a loan) or proposed product has an attributes supplied at delivery within the MISMO data sets and/or FREDDIE MAC Forms 11 and 13 or other delivery data sets.

After receipt of the data representation of the financial product or proposed financial product in S100, in S110 the attribute pattern may be checked against one or more usage criteria and/or loan types, and the CoATs associated therewith. If the attribute pattern is new and is not encompassed by any usage criteria existing in memory (i.e., "No match" in S110), a new usage criteria may be defined to encompasses the new attribute pattern in S130. On the other hand, if there is a match is S110, the process proceeds to S120, where the usage criteria is assigned to the attribute pattern. The usage criterion may be based on specific values or ranges of the attributes of the standardized data sets mentioned above. The usage criteria may include certain ranges of different variables or different conditions of the standard information or of any other information that may be associated with the data representation (for example associated through secondary attributes).

After the new usage criteria has or loan type has been defined in step S130, a CoAT may be created in S140 and then associated with the new usage criteria or loan type in S150. Association of the CoAT with the usage criteria permits the system to assign a CoAT to a data representation if the new usage criteria is matched with an attribute pattern with the attribute pattern is compared with the plurality of usage criteria.

Alternatively or additionally, the CoAT may be further associated with a loan type. The loan type may be identified as one of the attributes in the attribute pattern of the data representation. By assigning a particular loan type to a certain CoAT, determining which CoAT should be assigned to any incoming loan may be simplified because a reduced number of attributes can be determined, analyzed or examined.

In one embodiment of the invention process, the CoAT may be represented by a metatag which identifies or is keyed to a CoAT in the set of CoATs which is stored in memory as a database of CoATs. The metatag triggers a computer system to apply (e.g., overlay) CoAT logic on the incoming funds transfer (e.g., data representation) after receipt of an electronic signal indicating receipt of payment.

At set-up the system may include a step of characterizing the loan properties to determine which CoAT should be applied. An appropriate CoAT is prepared based on the expected cash flow. The expected cash flow can be derived from one of several sources including the properties of the original loan or from information transmitted together with the data representation.

An advantage of the invention over legacy systems is the ability to quickly apply and change CoATs. An assigned CoAT may be reassigned or changed based upon information received from, for example, a servicing agent. It is possible that the loan provides in its contractual terms the ability for the borrower to change the nature of the payments (e.g., the nature of the cash flow represented by the borrower's payment(s)). Such changes may include moving from a variable rate to a fixed rate, including a skip-pay provision, paying down the principal of the loan, altering payment frequency, etc. Detection of any signal that the loan has changed, for example a signal in the attribute pattern, payment event or business event, triggers the system to calculate and post principal and/or interest to accounts based on the reported payment event. Some business events, typically at the institutional level, may cause a new CoAT to be retrieved from a database of CoATs. Alternatively the existing CoAT may be edited to include new or different CoAT components depending on the new provisions and/or conditions of the loan.

Many events can occur that may cause a change in the number of accounts, identity of accounts, or proportion of the incoming cash flow stream apportioned to a particular account. For example, the servicing agent who is responsible for servicing a loan may change and may require a different compensation structure (some servicers are paid a percentage of the interest, some are paid a flat rate). This may result in a change in the way the servicing fee is calculated. One way to account for this change is to apply a new CoAT to the loan. The new CoAT may contain a different proportion of the cash flow divisions or may contain new or different accounts to which portions of the cash flow are posted.

The cash flow environment and business environment of the loan may change over time. For example, the borrower may choose to repay under a different repayment schedule, the borrower may default, or a business event may require application of a different CoAT. Such changes may occur after one or more of the periodic payments have been made on the loan, a base CoAT has been assigned, and the initial payments have been received by the party having beneficial owner rights to the loan. Changes in the loan or in the loan environment (e.g., changes in the inherent or secondary attributes or other business events) may result in a need to apply a different CoAT. For example, if the collateral or underlying property of a loan is changed and the assignment of a new or secondary guarantor is needed, then a new CoAT may be applied and a proportion of the borrower's payments may be distributed to the second or different guarantor in compensation for the guarantee for the new or changed collateral or property.

Once it has been determined whether the loan should be subject to a base CoAT or any other CoAT, the expected cash flow streams from the loan may be derived through a forecasting process that results in a forecast of distributed cash flows (e.g., forecast of distributions). The forecast may take into account the loan's inherent attributes such as the loan maturity, periodic payment pattern, current status, etc., and models to predict the distribution of cash flows into accounts such as, for example, principal and/or interest.

A step of comparing the expected cash flow with the actual cash flow received may be carried out during diagnosis of the payment activity. By comparing the forecasted cash flow amount to the actual cash flow amount it is possible to predict whether the loan has undergone a change (e.g., a change which is reflected in the inherent or secondary attributes) or the environment impacting the loan has changed (e.g., a business event) or that simply more or less than the expected payment activity occurred. The system may then determine whether the assignment of a different cash flow distribution model and/or apportionments of cash flows is appropriate. Forecasting may take into account what happened last month with what happened this month or what is expected to happen this month. Forecasting may also be carried out on any other time period.

Forecasting may include a calculation which involves a mathematical breakdown of the cash flow streams. For example, during calculation the principal and interest portion payments of a loan can be determined. Calculation therefore permits payment allocation of any component of the cash flow streams into one or more sub-categories.

Many of the changes that can affect the cash flow distributions from a cash flow stream occur on a short time scale. For example, an owner of a loan or a loan pool may determine that a servicer is operating inappropriately. The owner may wish to change the servicer's fee immediately or exchange the servicer for another party. Whereas in conventional hard-coded systems such changes would require significant programming time and/or accounting time, the inventive method using CoATs permits real time changes in the cash flow distributions by applying a different template whenever so desired by the owner or as a result of a specific business event. The changes can be implemented in real time (e.g., in a manner of minutes or hours) that is shorter than the periodicity of payment for the loan.

Such declarative changes may occur, for example, through a template manager system. The template manager system permits an individual to make declarative changes through a software interface. Such an interface may include a mechanism by which a representative of the servicer reassigns, reapportions, redistributes or adds new cash flowed distributions by editing the previous template or by creating a new template. The process may be carried out through a graphical user interface (GUI) or through other software interfaces such as java script.

Thus, the application of a template to a cash flow stream can be carried out in an efficient and flexible manner. One way that a CoAT can be assigned is through a declarative process that involves assigning new and/or revised templates to a financial product and/or cash flow stream through, for example, a graphical user interface or through logic programmed into the system in advance. Declarative reassignments and/or redefinitions can be carried out without recoding a legacy-type system.

In legacy systems many or all of the individual cash flow streams associated with the loan, for example the servicer fee and guarantee fee, are preset either contractually or are otherwise not variable due to constraints in the legacy systems methodology for assigning and tracking certain components of the cash flow streams. As mentioned before, loans treated in with legacy systems (e.g., where the distribution of an incoming cash flow stream can not be readily changed) have certain disadvantages. These disadvantages are manifested in a lack of flexibility with respect to making changes in the underlying account structure of the loan.

For example, in a legacy system a loan servicer may have been granted or given a certain servicing fee at the initiation of the loan or by contractual agreement with the holder of the loan pool. If a different servicer or other party is later able to offer a different rate and obtain the servicing rights to the loan or loan pool both the new rate and the new servicer must be reflected in the cash flow distributions associated with cash flow stream of the loan. If it is not possible for the loan or loan pool holder to quickly take into account the servicer's performance, the underwriter may have no negotiating power with which to encourage the servicer to improve performance.

The use of CoATs to redefine and change cash flow distributions associated with any number of loans in a loan pool provides a method that allows redefinition and redistribution of cash flow streams in a very short period of time without requiring the recoding of any underlining software.

Figure 6:
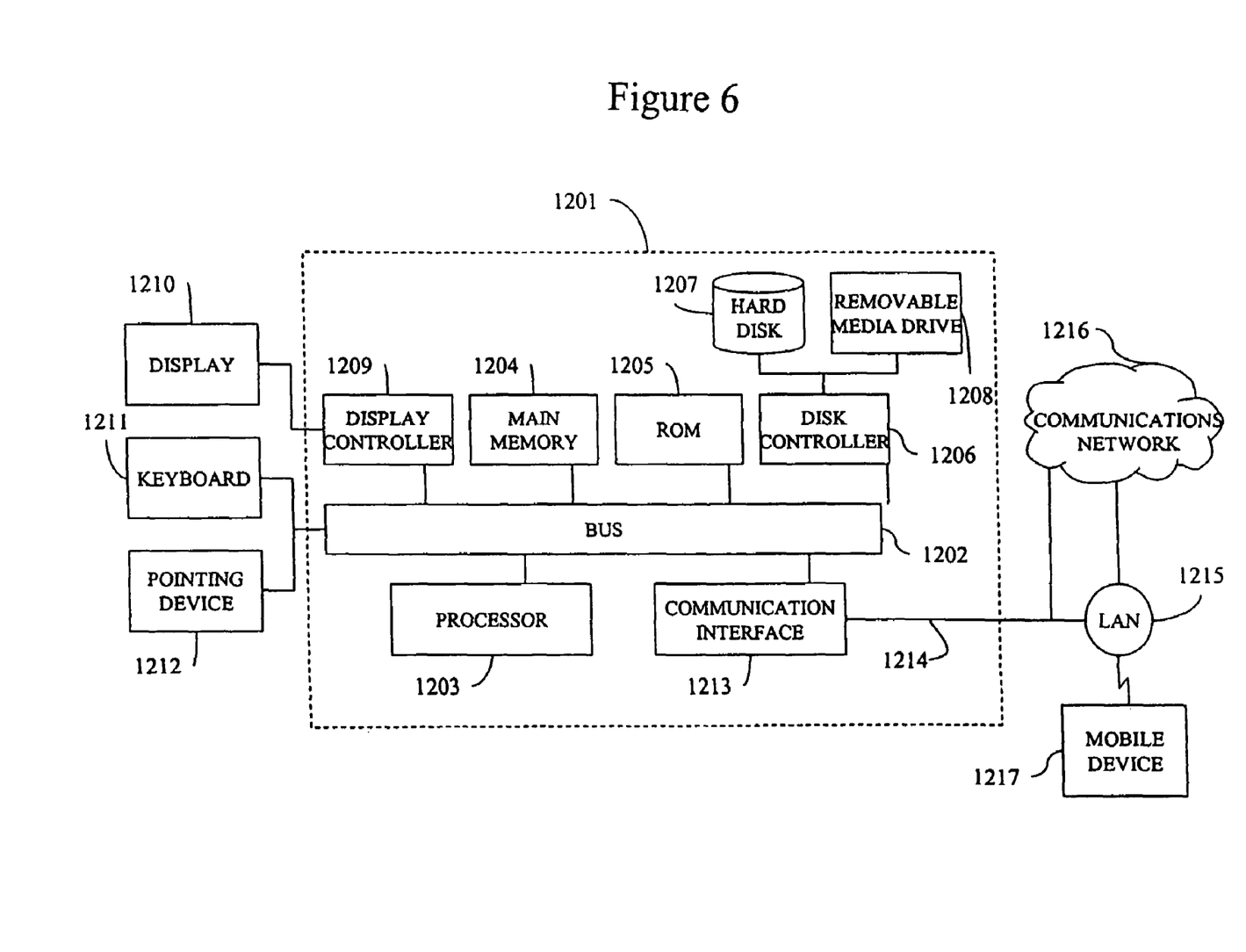
FIG. 6 is a block diagram of a computer-based system for performing the processing described in FIGS. 2-5.

FIG. 6 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. For example, the processor 1203 executes a comparison operation between the attribute pattern of the data representation (input via interface 1213) and the usage criteria, each of which are stored in memory 1204. Instructions executed by the processor 1203 may be read into the main memory 1204 from another computer readable medium, such as a hard disk 1207 or a removable media drive 1208. These instructions execute the various queries in FIGS. 4 and 5, such as steps S2, S5, S7, and S110, and well as the execution routines such as described in steps S3, S6, S8, S120, and S150. Likewise, these various computer readable media are all suitable for holding the set of CoATs for application to the data representation. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer-implemented financial accounting method, comprising steps of:
   receiving, in the processor, an electronic data representation of a record of a financial product, wherein the financial product includes a plurality of cash flows, said data representation having a computer-readable attribute pattern;
   comparing, in the processor, the computer-readable attribute pattern with a plurality of usage criteria stored in memory, each of said usage criteria having a predetermined set of values and each is associated with a chart of accounts template that is part of a set of chart of accounts templates stored in memory, to identify a particular chart of accounts template for the computer-readable attribute pattern; and
   assigning, in the processor, the particular chart of accounts template to the electronic data representation by matching the electronic form of the data representation with the chart of accounts template stored in memory,
   changing, in the processor, at least one cash flow of the financial product based on the chart of accounts template;
   wherein the changing redistributes an electronic representation of an incoming cash flow stream of a borrower's payments received by an electronic funds transfer to a plurality of accounts in amounts different from amounts defined in the data representation.

2. The computer-implemented financial accounting method of claim 1, wherein said financial product includes at least one of a loan and a mortgage.

3. The computer-implemented financial accounting method of claim 1, wherein said financial product is at least one of a loan and a loan pool in a secondary mortgage market.

4. The computer-implemented financial accounting method of claim 1, wherein the attribute pattern comprises at least one inherent attribute and at least one secondary attribute.

5. The computer-implemented financial accounting method of claim 4, wherein said inherent attribute includes at least one of a borrower attribute, a note attribute, and a property attribute.

6. The computer-implemented financial accounting method of claim 5, wherein said secondary attribute includes at least one of a description of a selling process and a description of a service process.

7. The computer-implemented financial accounting method of claim 1, wherein the record is a payment of a cash flow stream comprising one or more payments.

8. The computer-implemented financial accounting method of claim 1, further comprising the step of:
   checking the data representation for a business event by executing a set of computer readable instructions stored in memory; and
   wherein the assigning step includes assigning the particular chart of accounts template to the data representation as a business event chart of accounts template that is associated with a business event when a business event is detected.

9. The computer-implemented financial accounting method of claim 8, wherein the business event is at least one of an accounting change, a regulatory change, a merger and a change in ownership of a financial product.

10. The computer-implemented financial accounting method of claim 1, wherein the data representation includes a payment associated with the financial product.

11. The computer-implemented financial accounting method of claim 10, further comprising the step of: crediting one or more accounts of the particular chart of accounts template with a portion of the payment associated with the financial product.

12. The computer-implemented financial accounting method of claim 1, wherein after the receiving and before the assigning, the method further comprises the steps of:
   defining for the attribute pattern a usage criteria having a set of predetermined values;
   determining and storing in memory the chart of accounts template associated with the financial product having the attribute pattern; and
   matching the chart of accounts template with the usage criteria for the financial product;
   wherein the usage criteria includes a set of values for the attribute pattern such that when a processor identifies the attribute pattern that matches the usage criteria, the chart of account template is associated with the financial product.

13. A computer program product including instructions encoded on a computer-readable medium and configured to enable a processor to perform a method for implementing a financial accounting method, comprising the steps of:
   receiving, in electronic form in the processor, an electronic data representation of a record of a financial product, wherein the financial product includes a plurality of cash flows, said data representation having a computer-readable attribute pattern;
   comparing, in the processor, the computer-readable attribute pattern with a plurality of usage criteria stored in memory, each of said usage criteria having a set of predetermined values and each is associated with a chart of accounts template that is part of a set of chart of accounts templates stored in memory, to identify a particular chart of accounts template for the computer-readable attribute pattern; and
   assigning, in the processor, the particular chart of accounts template to the electronic data representation by matching the electronic data representation with the chart of accounts template store in memory,
   changing, in the processor, at least one cash flow of the financial product based on the chart of accounts template;
   wherein the changing redistributes an electronic representation of an incoming cash flow stream of a borrower's payments received by an electronic funds transfer to a plurality of accounts in amounts different from amounts defined in the data representation.

14. The computer program product of claim 13, wherein the data representation includes a payment associated with the financial product.

15. The computer program product of claim 14, further comprising the steps of: crediting one or more accounts of the particular chart of accounts template with a portion of the payment associated with the financial product.

16. The computer program product of claim 13, further comprising the steps of:
   checking the data representation for a business event with one or more analysis routines stored in memory; and
   assigning a business event chart of accounts template to the data representation, wherein the business event chart of accounts template is associated with the detected business event.

17. A system for implementing a financial accounting method, comprising:
   means for receiving an electronic data representation of a record of a financial product, wherein the financial product includes a plurality of cash flows, said data representation having a computer-readable attribute pattern;
   means for comparing the computer-readable attribute pattern with a plurality of usage criteria stored in memory, each of the usage criteria having a set of predetermined values and is associated with a chart of accounts template that is part of a set of chart of accounts templates stored in memory, to identify a particular chart of accounts template for the computer-readable attribute pattern;
   means for assigning the particular chart of accounts template to the data representation by matching the electronic data representation with the chart of accounts template stored in memory, and
   means for changing at least one cash flow of the financial product based on the chart of accounts template to redistribute an electronic representation of an incoming cash flow stream of a borrower's payments received by an electronic funds transfer to a plurality of accounts in amounts different from amounts defined in the data representation.

18. A computer-implemented system for implementing a financial accounting method, comprising:
   a processor configured to receive an electronic data representation of a record of a financial product, said data representation having a computer-readable attribute pattern, wherein the financial product includes a plurality of cash flows;
   a computer readable medium configured to have stored thereon said electronic data representation, a plurality of usage criteria and a set of chart of accounts templates; and
   wherein the processor is configured to compare the computer-readable attribute pattern with the plurality of usage criteria stored in memory, each of said usage criteria having a predetermined set of values and each is associated with a chart of accounts template that is part of a set of chart of accounts templates stored in memory, to identify a particular chart of accounts template for the computer-readable attribute pattern; wherein
   wherein the processor is configured to assign the particular chart of accounts template to the data representation of the record, by matching the electronic data representation with the chart of accounts template store in memory,
   wherein the processor is configured to change at least one cash flow of the financial product based on the chart of accounts template;

wherein the processor changes at least one cash flow by redistributing an electronic representation of an incoming cash flow stream of a borrower's payments received by an electronic funds transfer to a plurality of accounts in amounts different from amounts defined in the data representation.

19. The computer-implemented system of claim 18, wherein said financial product includes at least one of a loan, a mortgage and a security.

20. The computer-implemented system of claim 18, wherein said financial product is a loan or a loan pool in a secondary mortgage market.

21. The computer-implemented financial accounting method of claim 18, wherein the attribute pattern comprises at least one inherent attribute and at least one secondary attribute.

22. The computer-implemented system of claim 21, wherein the attribute pattern comprises an inherent attribute including at least one of a borrower attribute, a note attribute, and a property attribute.

23. The computer-implemented system of claim 21, wherein the attribute pattern comprises a secondary attribute including at least one of a description of a selling process and a description of a servicing process.

24. The computer-implemented system of claim 18, wherein the record includes a representation of a payment of a cash flow stream comprising one or more payments.

25. The computer-implemented system of claim 18, further comprising the steps of:
  checking the data representation for a business event with one or more analysis routines stored in memory; and
  assigning a business event chart of accounts template to the data representation, wherein the business event chart of accounts template is associated with the business event when a business event is detected.

26. The computer-implemented system of claim 25, wherein the business event is at least one of an accounting change, a regulatory change, a merger and a change in ownership of a financial product.

27. The computer-implemented financial accounting method of claim 18, wherein the data representation includes a payment associated with the financial product.

28. The computer-implemented financial accounting method of claim 27, further comprising the steps of: crediting one or more accounts of the particular chart of accounts template with a portion of the payment associated with the financial product.

29. The computer-implemented financial accounting method of claim 18, wherein after the receiving and before the assigning, the method further comprises the steps of:
  defining for the attribute pattern a usage criteria having a set of predetermined values;
  generating and storing in memory the chart of accounts template associated with the financial product having the attribute pattern; and
  matching the chart of accounts template with the usage criteria for the financial product;
  wherein the usage criteria includes a set of values for the attribute pattern such that when a processor identifies the attribute pattern that matches the usage criteria the chart of account template is associated with the financial product.

30. A computer-implemented financial accounting method, comprising steps of:
  receiving, in a processor, an electronic data representation of a record of a financial product, wherein the financial product includes a plurality of cash flows, said data representation having a computer-readable attribute pattern;
  defining, in memory, for the computer-readable attribute pattern a usage criteria having a set of predetermined values;
  generating and storing in memory, in electronic form, a chart of accounts template associated with the financial product having the attribute pattern; and
  matching, in the processor, the chart of accounts template stored in memory with the usage criteria for the financial product;
  wherein the usage criteria includes a set of values for the attribute pattern such that when the processor identifies the attribute pattern that matches the usage criteria the chart of accounts template is associated with the financial product
  changing, in the processor, at least one cash flow of the financial product based on the chart of accounts template;
  wherein the changing redistributes an electronic representation of an incoming cash flow stream of a borrower's payments received by an electronic funds transfer to a plurality of accounts in amounts different from amounts defined in the data representation.

31. The computer-implemented financial accounting method of claim 30, wherein the attribute pattern comprises at least one of an inherent attribute and a secondary attribute.

32. The computer-implemented financial accounting method of claim 30, wherein the predetermined values include a permissible range for one or more of a maturity date, an interest rate, an servicer fee, and a guarantor fee.

33. The computer-implemented financial accounting method of claim 30, wherein said financial product includes at least one of a loan, a mortgage and a security.

34. The computer-implemented financial accounting method of claim 30, wherein said inherent attribute includes at least one of a borrower attribute, a note attribute, and a property attribute.

35. The computer-implemented financial accounting method of claim 30, wherein said secondary attribute includes at least one of a description of a selling process and a description of a servicing.

36. A computer program product including instructions encoded on a computer-readable medium and configured to enable a processor to perform a method for implementing a financial accounting method, comprising steps of:
  receiving, in a processor, an electronic data representation of a record of a financial product, wherein the financial product includes a plurality of cash flows, said data representation having a computer readable attribute pattern;
  defining, in memory, for the computer readable attribute pattern a usage criteria having a set of predetermined values;
  generating and storing in memory, in electronic form, a chart of accounts template associated with the financial product having the attribute pattern; and
  matching, in the processor, the chart of accounts template stored in memory with the usage criteria for the financial product;
  wherein the usage criteria includes a set of values for the attribute pattern such that when the processor identifies the attribute pattern that matches the usage criteria the chart of accounts template is associated with the financial product, changing, in the processor, at least one cash flow of the financial product based on the chart of accounts template;

wherein the changing redistributes an electronic representation of an incoming cash flow stream of a borrower's payments received by an electronic funds transfer to a plurality of accounts in amounts different from amounts defined in the data representation.

37. A system for implementing a financial accounting method, comprising:

means for receiving an electronic data representation of a record of a financial product, wherein the financial product includes a plurality of cash flows, said data representation having computer readable attribute pattern;

means for defining, in memory, for the attribute pattern a usage criteria having a set of predetermined values;

means for generating and storing in memory, in electronic form, a chart of accounts template associated with the financial product having the attribute pattern; and means for matching the chart of accounts template stored in memory with the usage criteria for the financial product, wherein the usage criteria includes a set of values for the attribute pattern such that when a processor identifies the attribute pattern that matches the usage criteria the chart of accounts template is matched with the financial product, means for changing at least one cash flow of the financial product based on the chart of accounts template to redistribute an electronic representation of an incoming cash flow stream of a borrower's payments received by an electronic funds transfer to a plurality of accounts in amounts different from amounts defined in the data representation.

38. A computer-implemented system for implementing a financial accounting method, comprising:

a processor configured to receive an electronic data representation of a record of a financial product, wherein the financial product includes a plurality of cash flows, said data representation having a computer readable attribute pattern;

a computer readable medium configured to have stored thereon said electronic data representation, a usage criteria and a set of chart of accounts templates; and wherein the processor is configured to read the usage criteria having a set of predetermined values for the attribute pattern, create and store in memory a chart of accounts template associated with the financial product having the attribute pattern, and associate the chart of accounts template with the usage criteria such that when the processor identifies the attribute pattern that matches the usage criteria the chart of accounts template is associated with the financial product, and wherein the processor is configured to change at least one cash flow of the financial product based on the chart of accounts template to redistribute an electronic representation of an incoming cash flow stream of a borrower's payments received by an electronic funds transfer to a plurality of accounts in amounts different from amounts defined in the data representation.

39. The computer-implemented system of claim 38, wherein the attribute pattern comprises at least one of an inherent attribute and a secondary attribute.

40. The computer-implemented system of claim 38, wherein the predetermined values include a permissible range for one or more of a maturity date, an interest rate, an servicer fee, and a guarantor fee.

41. The computer-implemented system of claim 38, wherein said financial product includes at least one of a loan, a mortgage and a security.

42. The computer-implemented system of claim 38, wherein said inherent attribute includes at least one of a borrower attribute, a note attribute, and a property attribute.

43. The computer-implemented system of claim 38, wherein said secondary attribute includes at least one of a description of a selling process, a description of a servicing process.

* * * * *